United States Patent
Kurihara

(10) Patent No.: US 7,518,771 B2
(45) Date of Patent: Apr. 14, 2009

(54) OPTICAL SCANNING DEVICE AND IMAGE FORMING APPARATUS EQUIPPED WITH THE SAME

(75) Inventor: Takayuki Kurihara, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 11/655,435

(22) Filed: Jan. 19, 2007

(65) Prior Publication Data

US 2007/0171498 A1    Jul. 26, 2007

(30) Foreign Application Priority Data

Jan. 24, 2006    (JP)    ............... 2006-014772

(51) Int. Cl.
G02B 26/08    (2006.01)
B41J 27/00    (2006.01)
(52) U.S. Cl. .................. 359/204; 359/205; 359/206; 347/232; 347/243
(58) Field of Classification Search .................. None
See application file for complete search history.

(56) References Cited

U.S. PATENT DOCUMENTS

| | | | |
|---|---|---|---|
| 4,812,917 | A | 3/1989 | Suzuki |
| 6,304,360 | B1 | 10/2001 | Sekikawa |
| 2004/0184125 | A1 | 9/2004 | Suzuki |
| 2005/0219672 | A1* | 10/2005 | Fujita et al. .................. 359/204 |
| 2006/0250673 | A1* | 11/2006 | Kudo .......................... 359/205 |
| 2006/0291028 | A1* | 12/2006 | Kim ........................... 359/216 |

FOREIGN PATENT DOCUMENTS

| | | |
|---|---|---|
| JP | 63-74258 | 4/1998 |
| JP | 11-109265 | 4/1999 |
| JP | 2000-180750 | 6/2000 |
| JP | 2003-222813 | 8/2003 |
| JP | 2005-288825 | 10/2005 |
| JP | 2006-11291 | 1/2006 |

* cited by examiner

*Primary Examiner*—James Phan
(74) *Attorney, Agent, or Firm*—Gerald E. Hespos; Anthony J. Casella

(57) ABSTRACT

An optical scanning device is configured in such a manner that, of four light beams for colors corresponding to black, cyan, magenta, and yellow, the angle of the reflection surface of the last folding mirror disposed in the optical path of a light beam corresponding to an image in black having the lowest brightness and the highest visibility is closest to vertical, and further, the angle of the reflection surface of the last folding mirror disposed in the optical path of a light beam corresponding to an image in yellow having the highest brightness and the lowest visibility is closest to horizontal. It is thus possible to reduce a color shift in the color image caused by reflecting a light beam having passed through the correction lens on the last folding mirror.

10 Claims, 2 Drawing Sheets

OPTICAL SCANNING DEVICE AND IMAGE FORMING APPARATUS EQUIPPED WITH THE SAME

BACKGROUND OF THE INVENTION

1. Field of the Invention

The present invention relates to an optical scanning device that scans light beams to write and form an image for use in an image forming apparatus, such as a printer, a facsimile machine, and a copying machine, and more particularly, to an optical scanning device suitably used in a color image forming apparatus, such as a color laser printer and a digital color copying machine, and an image forming apparatus equipped with the same.

2. Description of the Related Art

An image forming apparatus in the related art using the electrophotographic method, such as a copying machine and a printer, is equipped with an optical scanning device that scans a light beam modulated according to input image data on the surface of a photoconductive drum charged uniformly by the charger. An image is formed by developing an electrostatic latent image formed by the optical scanning device into a toner image by the developing device, and then transferring the toner image onto a recording sheet of paper or the like.

Incidentally, as a color image forming apparatus is becoming faster, a digital copying machine or a laser printer adopting a method (so-called 4-drum tandem method) is now put into practical use, in which, for example, four photoconductive drums are aligned in the transportation direction of recording sheets of paper to form electrostatic latent images by exposing the photoconductive drums to light simultaneously using plural optical scanning devices corresponding to the respective photoconductive drums, and after these electrostatic latent images are developed into toner images by the developing devices that use developing agents in different colors, such as black, magenta, cyan, and yellow, these toner images are transferred onto the same recording sheet of paper successively so as to be superimposed one on another for a color image to be obtained.

According to the 4-drum tandem method, because an image can be outputted at the same speed in either color printing or monochromatic printing, it is advantageous when fast printing is desired. However, because four optical scanning devices are provided correspondingly to four photoconductive drums to expose the drums, the apparatus tends to increase in size. Meanwhile, to meet the need for a compact image forming apparatus in recent years, there has been proposed an optical scanning device that is made compact by configuring in such a manner that plural light beams emitted from the light sources provided separately for respective colors are deflected by a single deflector, so that the light beams are guided to different photoconductors to expose and scan the corresponding photoconductors (for example, see JP-A-2000-180750).

The optical scanning device of a type proposed in JP-A-2000-180750 is configured in such a manner that light beams go incident on the deflector at different angles in the sub-scanning direction for making it easier to separate optical paths of plural deflected light beams. This gives rise to bows (a phenomenon that scanning lines of light beams deflected by the defector are curved) of different quantities in the respective light beams deflected by the deflector. Because the quantities of the bows vary among the respective light beams, a color shift occurs in the resulting color image.

Such being the case, JP-A-2005-288825 proposes an optical scanning device that makes a color shift or an image curve in the color image caused by bows occurring in the light beams hardly noticeable by setting, of plural light beams corresponding to developing agents in different colors, a smaller angle of incidence on the deflector for light beams corresponding to developing agents having high visibility, that is, low brightness while setting a larger angle of incidence on the deflector for light beams corresponding to developing agents having low visibility, that is, high brightness.

For the optical scanning device of a type proposed in JP-A-2005-288825, it is, however, necessary to dispose plural folding mirrors as reflection members inside the optical scanning device to guide light beams to the corresponding photoconductors. The folding mirrors are disposed inside the optical scanning device with the both end portions being held so as not to interrupt the optical paths of the light beams. However, because the folding mirrors are held at the both end portions alone, they eventually bend due to their own weights and the reflection surfaces are curved. The scanning line of a light beam reflected on the bent folding mirror is curved as well.

In addition, for the reason of setting the optical paths of light beams, plural folding mirrors provided inside the optical scanning device are installed at different angles. The magnitude of the bend occurring in the folding mirror varies with the angle at which the folding mirror is installed. The magnitude becomes larger as the angle of installation of the reflection surface becomes closer to horizontal, and the magnitude becomes smaller as the angle of installation of the reflection surface becomes closer to vertical. Accordingly, curves of different magnitude occur in the scanning lines of the light beams reflected on the folding mirrors installed at different angles.

Generally, a correction lens furnished with an optical face tangle error correction capability is provided somewhere in the middle of each optical path of light beams, and the curve of the scanning line of a light beam as described above is corrected by allowing the light beam to pass through the correction lens. However, in a case where a curve of different magnitude occurs in the scanning line of each light beam after the light beam passed through the correction lens due to a difference of the angle of installation among the folding mirrors as described above, the curve thus occurred is not corrected and the curved scanning line directly scans the photoconductive drum. This poses a problem that a color shift resulting from displacement of the scanning line occurs in the formed color image.

SUMMARY OF THE INVENTION

An advantage of the invention is to provide an optical scanning device capable of reducing a color shift in a color image caused by reflecting a light beam having passed through a correction member, and an image forming apparatus equipped with the same.

An optical scanning device according to one aspect of the invention includes: plural light sources that emit light beams corresponding to images using developing agents each having different brightness; a deflector that deflects plural light beams emitted from the plural light sources as the plural light beams go incident on a same reflection surface thereof at different angles of incidence in a sub-scanning direction; plural correction members that correct the plural light beams deflected by the deflector; and plural last reflection members that reflect the light beams corrected by the plural correction members to be distributed to surfaces of different photoconductors, wherein, of the plural last reflection members, a last reflection member provided in an optical path of a light beam corresponding to an image using a developing agent having lowest brightness is provided so that an angle of installation of a reflection surface of the last reflection member is closest to vertical.

In this optical scanning device, an image using a developing agent having the lowest brightness has the highest visibility and displacement of the image is noticeable. However, by configuring in such a manner that the angle of the reflection surface of the last reflection member provided in the optical path of a light beam corresponding to an image using this developing agent is closest to vertical, the curve of the reflection surface can be smallest, which makes the curve of the scanning line smaller. Displacement of the formed image therefore becomes so minor that a color shift in the color image becomes hardly noticeable. It is thus possible to reduce a color shift in the color image caused by reflecting a light beam having passed through the correction member by the last reflection member.

DETAILED DESCRIPTION OF THE PREFERRED EMBODIMENT

Figure 1:
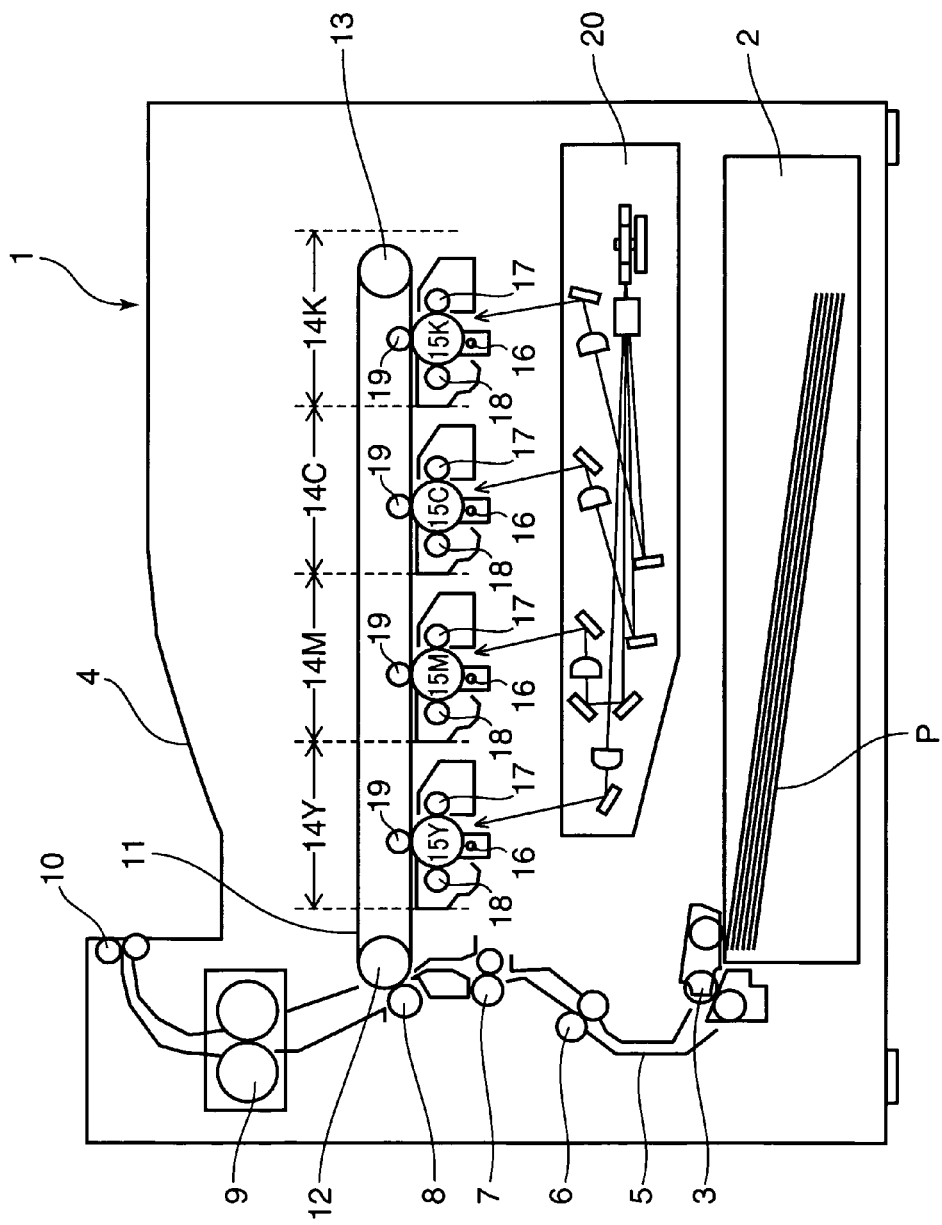
FIG. 1 is a view schematically showing the configuration of an image forming apparatus equipped with an optical scanning device according to one embodiment of the invention.

Hereinafter, an image forming apparatus equipped with an optical scanning device according to one embodiment of the invention will be described with reference to the drawings. FIG. 1 is a view schematically showing the configuration of the image forming apparatus equipped with the optical scanning device according to one embodiment of the invention, and a 4-drum tandem type color image forming apparatus is shown therein.

A paper feeding portion 2, such as a paper feeding cassette, to store a pile of sheets of paper is provided at the lower portion of the color image forming apparatus 1. A separator feeding member 3 to feed sheets of paper P one by one from the top of the pile is provided at one end portion of the paper feeding portion 2. A paper transportation path 5 extending upward to reach a discharge tray 4 formed on the top surface of the main body is defined above the separator feeding member 3. The separator feeding member 3, a pair of transportation rollers 6, a pair of register rollers 7, a transfer roller 8, a pair of fixing rollers 9, and a pair of paper discharging rollers 10 are disposed sequentially along the paper transportation path 5 from upstream in the paper transportation direction.

An intermediate transfer belt 11 is provided in a rotatable manner at the right of the transfer roller 8. The intermediate transfer belt 11 is stretched over a drive roller 12 and a driven roller 13, and it rotates in a clockwise direction in association with rotational driving by the drive roller 12. The drive roller 12 abuts on the transfer roller 8 via the intermediate transfer belt 11. A sheet of dielectric resin is used for the intermediate transfer belt 11, and a belt formed in an endless shape by overlapping and joining the both end portions or a seamless belt is suitably used.

Below the intermediate transfer belt 11 are sequentially provided four image forming portions 14K, 14C, 14M, and 14Y along the rotational direction, in other words, from right to left in FIG. 1, that is, along a direction in which the intermediate transfer belt 11 moves (sub-scanning direction). These image forming portions 14K through 14Y are provided correspondingly to images in four different colors (black, cyan, magenta, and yellow), and respectively form images in black, cyan, magenta, and yellow in series in the charging, exposing, developing, and transferring steps.

The image forming portions 14K through 14Y are provided, respectively, with photoconductive drums 15K, 15C, 15M, and 15Y that carry visible images (toner images) in the corresponding colors. On the periphery of the photoconductive drums 15K through 15Y provided in a rotatable manner are disposed chargers 16 that charge the corresponding photoconductive drums 15K through 15Y, developing units 17 that form toner images on the corresponding photoconductive drums 15K through 15Y, cleaning portions 18 that remove developing agents remaining on the corresponding photoconductive drums 15K through 15Y, and intermediate transfer rollers 19 that abut on the corresponding photoconductive drums 15K through 15Y via the intermediate transfer belt 11. Further, an optical scanning device 20 is provided below the photoconductive drums 15K through 15Y to expose the respective photoconductive drums 15K through 15Y to light according to image information.

An image forming operation by the color image forming apparatus 1 configured as above will now be described. When the user inputs an instruction to start the image formation, the respective photoconductive drums 15K through 15Y are rotationally driven first, so that the surfaces of the respective photoconductive drums 15K through 15Y are charged uniformly by the corresponding chargers 16. Subsequently, light beams are irradiated to the respective photoconductive drums 15K through 15Y by the optical scanning device 20 while being scanned in the main scanning direction (a direction orthogonal to the sheet surface of FIG. 1) according to input image signals, so that electrostatic latent images according to the image signals are formed on the respective photoconductive drums 15K through 15Y.

Developing agents in respective colors including black, cyan, magenta, and yellow filled in the corresponding developing units 17 from unillustrated replenishing devices are supplied to the respective photoconductive drums 15K through 15Y, and toner images according to the electrostatic latent images are formed. After an electric field is conferred to the intermediate transfer belt 11 at a specific transfer voltage, the toner images in black, cyan, magenta, and yellow on the photoconductive drums 15K through 15Y, respectively, are transferred onto the intermediate transfer belt 11 by the corresponding intermediate transfer rollers 19.

These images in four colors are formed in a specific positional relation pre-determined for specific full-color image formation. Subsequently, the developing agents remaining on the surfaces of the photoconductive drums 15K through 15Y are removed by the corresponding cleaning portions 18 to prepare for new electrostatic latent images that will be formed next continuously.

Meanwhile, when the intermediate transfer belt 11 starts to rotate in a clockwise direction in association with the rotations of the drive roller 12 by a driving motor (not shown), a sheet of paper P is transported from the pair of register rollers 7 to the transfer roller 8 provided adjacently to the intermediate transfer belt 11 at specific timing, and a full-color image is transferred on the sheet of paper P. The sheet of paper P on which are transferred the toner images is transported to the pair of fixing rollers 9. Heat and a pressure are applied to the sheet of paper P by the pair of fixing rollers 9 for the toner images to be transferred on the surface thereof. A specific full-color image is thus formed. The sheet of paper P on which is formed the full-color image is then discharged onto the discharge tray 4 by the pair of discharging rollers 10.

Figure 2:
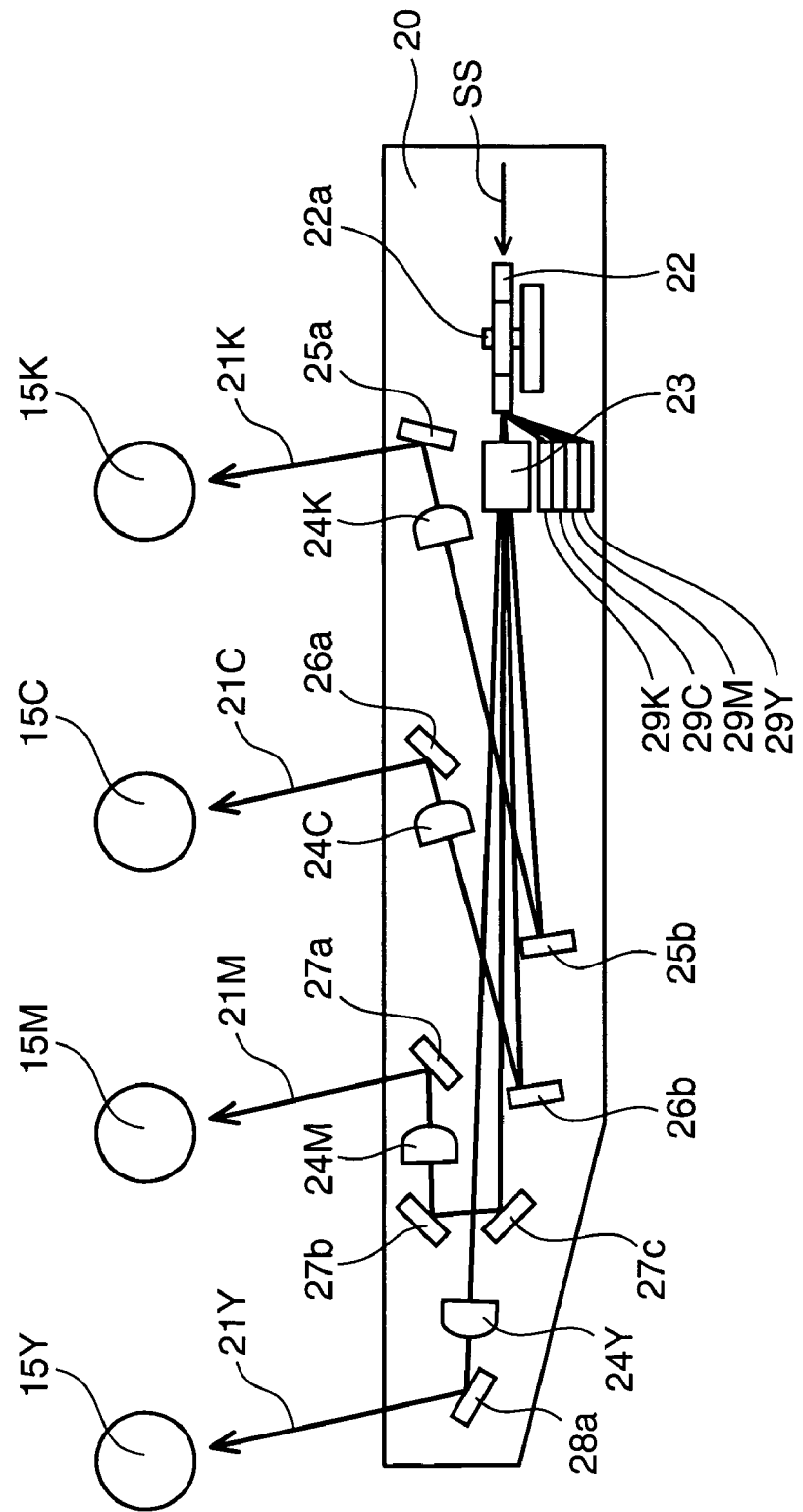
FIG. 2 is a view schematically showing the configuration of the optical scanning device shown in FIG. 1.

Referring to FIG. 2, the optical scanning device 20 will be described further. FIG. 2 is a view schematically showing the configuration of the optical scanning device 20 shown in FIG. 1, and only the photoconductive drums 15K through 15Y provided, respectively, to the image forming portions 14K through 14Y are shown for ease of description. The optical scanning device 20 includes four light sources 29K through 29Y that emit light beams 21 modulated according to image signals, a polygon mirror 22, an fθ lens 23, correction lenses 24K through 24Y, and folding mirrors 25a, 25b, 26a, 26b, 27a through 27c, 28a, and 28b provided in the respective optical paths. In FIG. 2, the locations of the four light sources 29K through 29Y are shown schematically for ease of illustration, and it should be appreciated that they may be disposed at places dispersed appropriately in a horizontal direction when the need arises. Also, the locations of the four light sources 29K through 29Y are not limited especially to the above described example and are determined as appropriate according to the locations of the folding mirrors and the polygon mirror.

The optical scanning device 20 is provided with the four light sources 29K through 29Y that respectively emit light beams 21K, 21C, 21M, and 21Y modulated according to image signals for black, cyan, magenta, and yellow. The polygon mirror 22 is a deflector of light beams and is provided inside the optical scanning device 20 in a rotatable manner. It can deflect the light beams 21K through 21Y that come incident on the reflection surface thereof at an equiangular velocity by rotating about the rotational axis 22a.

The fθ lens 23 deflects the light beams 21 deflected at an equiangular velocity by the polygon mirror 22 at a constant velocity in such a manner that the light beams 21K through 21Y that scan the surfaces of the photoconductive drums 15K through 15Y, respectively, will scan the corresponding surfaces in the main scanning direction at a constant velocity.

The correction lenses 24K through 24Y are correction members of the light beams 21K through 21Y, and each is furnished with an optical face tangle correction capability to correct an error occurring in the light beams 21K through 21Y deflected by the polygon mirror 22 due to a phenomenon known as optical face tangle that the reflection surface of the polygon mirror 22 inclines with respect to the rotational axis 22a.

The folding mirrors 25a, 25b, 26a, 26b, 27a through 27c, 28a, and 28b are reflection members provided in the optical paths of the respective light beams 21K through 21Y. Each comprises a thin-plate-shaped mirror and is disposed inside the optical scanning device 20 with the both end portions (for example, the both end portions in the horizontal direction) being held. The numbers of the folding mirrors 25a, 25b, 26a, 26b, 27a through 27c, 28a, and 28b disposed in the corresponding optical paths and the angles of installation of the reflection surfaces thereof can be changed when the need arises.

Because the folding mirrors 25a, 25b, 26a, 26b, 27a through 27c, 28a, and 28b disposed inside the optical scanning device 20 are held at the both end portions alone, the reflection surfaces thereof are curved as they eventually bend with their own weights, and the scanning lines of the light beams 21 reflected thereon are naturally curved. It is therefore preferable to provide the correction lenses 24K through 24Y in such a manner so as to allow the light beams 21K through 21Y that have been corrected to go incident on the photoconductive drums 15K through 15Y, respectively, without the use of the folding mirrors. However, for the reasons of layout, as is shown in FIG. 2, the last folding mirrors 25a, 26a, 27a, and 28a as the last reflection members are provided in all the optical paths, one in each, for the light beams 21K through 21Y having passed through the correction lenses 24K through 24Y, respectively.

A light beam scanning operation by the optical scanning device 20 configured as above will now be described. The light beams 21K through 21Y, respectively, from the four light sources 29K through 29Y go incident on the reflection surface of the polygon mirror 22 first. In this instance, in order to make it easier to separate the optical paths of the four light beams 21K through 21Y deflected by the polygon mirror 22, it is configured in such a manner that these light beams 21K through 21Y go incident on the same reflection surface of the polygon mirror 22 in the sub-scanning direction SS at different angles.

The light beams 21K through 21Y that come incident on the polygon mirror 22 are deflected at an equiangular velocity by the polygon mirror 22, and then deflected at a constant velocity by the fθ lens 23. The light beams 21K through 21Y deflected at a constant velocity are folded predetermined numbers of times by the corresponding folding mirrors 25b, 26b, 27b, 27c, and 28b serving as the reflection members disposed in the corresponding optical paths. After errors resulting from the optical face tangle are corrected by passing through the correction lenses 24K through 24Y, the light beams 21K through 21Y are folded, respectively, by the last folding mirror 25a through 28a provided at the ends of the optical paths, and distributed to the surfaces of the photoconductive drums 15K through 15Y, respectively.

Herein, it is configured in such a manner that, as is shown in FIG. 2, of the four light beams 21K through 21Y corresponding to the colors including black, cyan, magenta, and yellow, respectively, the angle of the reflection surface of the last folding mirror 25a provided in the optical path of the light beam 21K corresponding to an image in black having the lowest brightness and the highest visibility is more vertical (in this embodiment, a direction orthogonal to the sub-scanning direction SS, that is, the direction of gravitational force) than the last folding mirrors 26a, 27a, and 28a provided in the other optical paths.

This makes it impossible to correct the curves of the scanning lines caused by the last folding mirrors 25a through 28a provided for the light beams 21K through 21Y having passed through the correction lenses 24K through 24Y, respectively, and the curves are directly reflected in the formed color image. However, the curve of the reflection surface of the last folding mirror 28a provided in the optical path of the light beam 21K corresponding to an image in black having high visibility becomes smallest, which makes the curve of the scanning line smaller. Displacement of the formed image in black is therefore so minor that a color shift in the color image becomes hardly noticeable.

Further, it is configured in such a manner that, as is shown in FIG. 2, of the four light beams 21K through 21Y corresponding to the colors including black, cyan, magenta, and yellow, respectively, the angle of the reflection surface of the last folding mirror 28a provided in the optical path of the light beam 21Y corresponding to an image in yellow having the highest brightness and the lowest visibility is more horizontal (in this embodiment, the sub-scanning direction SS, that is, a direction orthogonal to the direction of gravitational force) than the last folding mirrors 25a, 26a, and 27a provided in the other optical paths.

Accordingly, the reflection surface is provided so as to be closest to horizontal, and in the optical path in which the curve of the reflection surface becomes largest, so does the curve of the scanning line of the light beam, which makes displacement of the formed image most significant. However, by determining such a light beam as the light beam 21Y corresponding to an image in yellow having low visibility, a color shift in the color image becomes hardly noticeable.

It should be appreciated that the invention is not limited to the embodiment above, and the invention can be modified in various manners without deviating from the scope of the invention. For example, the embodiment above has described the image forming apparatus using the intermediate transfer belt. However, the invention is also applicable to an image forming apparatus that performs color image formation by carrying a sheet of paper on the transfer belt and transferring images formed on plural photoconductive drums directly onto the sheet of paper so as to be superimposed one on another. Also, the embodiment above has described the image forming apparatus using developing agents in four colors including yellow, magenta, cyan, and black to obtain a full-color image. However, the invention is also applicable to an image forming apparatus provided with color materials of different hues or an image forming apparatus having a different number of colors.

The embodiment above has described only the optical scanning device 20 equipped with a single polygon mirror 22. However, the invention can be also applied in the same manner, for example, to an optical scanning device equipped with two polygon mirrors inside the device and configured to deflect light beams 21K and 21C for black and cyan, respectively, by one of the polygon mirrors and deflect the light beams 21M and 21Y for magenta and yellow, respectively, by the other polygon mirror.

The invention can be used for an optical scanning device that scans light beams to write and form an image and equipped to an image forming apparatus, such as a printer, a facsimile machine, and a copying machine. In particular, the invention can be used suitably to an optical scanning device equipped to a color image forming apparatus, such as a color laser printer and a digital color copying machine.

As has been described, an optical scanning device according to one aspect of the invention includes: plural light sources that emit light beams corresponding to images using developing agents each having different brightness; a deflector that deflects plural light beams emitted from the plural light sources as the plural light beams go incident on a same reflection surface thereof at different angles of incidence in a sub-scanning direction; plural correction members that correct the plural light beams deflected by the deflector; and plural last reflection members that reflect the light beams corrected by the plural correction members to be distributed to surfaces of different photoconductors, wherein, of the plural last reflection members, a last reflection member provided in an optical path of a light beam corresponding to an image using a developing agent having lowest brightness is provided so that an angle of installation of a reflection surface of the last reflection member is closest to vertical.

According to the configuration above, an image using a developing agent having the lowest brightness has the highest visibility and displacement of the image is noticeable. However, by configuring in such a manner that the angle of the reflection surface of the last reflection member provided in the optical path of a light beam corresponding to an image of this developing agent is closest to vertical, the curve of the reflection surface can be smallest, which makes the curve of the scanning line smaller. Displacement of the formed image therefore becomes so minor that a color shift in the color image becomes hardly noticeable. It is thus possible to reduce a color shift in the color image caused by reflecting a light beam having passed through the correction member by the last reflection member.

It is preferable that, of the plural last reflection members, a last reflection member provided in an optical path of a light beam corresponding to an image using a developing agent having highest brightness is provided so that an angle of installation of a reflection surface of the last reflection member is closest to horizontal.

In this case, the reflection surface of the last reflection member provided in the optical path of a light beam corresponding to an image using the developing agent having the highest brightness is provided to be closest to horizontal, and the curve of the scanning line of the light beam becomes largest in the optical path in which the curve of the reflection surface is largest, which makes displacement of the formed image most significant. However, by determining such a light beam as a light beam corresponding to an image using the developing agent having the lowest visibility, a color shift in the color image becomes hardly noticeable. It is thus possible to further reduce a color shift in the color image caused by reflecting a light beam having passed through the correction member by the last reflection member.

It is preferable that each of the plural correction members corrects an error occurring in a corresponding light beam due to optical face tangle that the reflection surface of the deflector inclines with respect to a rotational axis of the deflector, and that the plural last reflection members are provided, one in each optical path, between the correction members and photoconductors provided correspondingly to the respective light beams.

In this case, after errors occurring in the respective light beams due to the optical face tangle that the reflection surface of the deflector inclines with respect to the rotational axis thereof are corrected, the respective light beams are reflected on the single, last reflection members alone to be guided to the corresponding photoconductors. Accordingly, the curve of each light beam caused by the curve of the corresponding last reflection member can be suppressed to the least possible extent. It is thus possible to further reduce a color shift in the color image caused by reflecting a light beam having passed through the correction member by the last reflection member.

It is preferable that: the plural light sources include a first light source that emits a first light beam corresponding to an image using a black developing agent, a second light source that emits a second light beam corresponding to an image using a cyan developing agent, a third light source that emits a third light beam corresponding to an image using a magenta developing agent, and a fourth light source that emits a fourth light beam corresponding to an image using a yellow developing agent in; the plural last reflection members include a first last reflection member that reflect the first light beam, a second last reflection member that reflects the second light beam, a third last reflection member that reflects the third light beam, and a fourth last reflection member that reflects the fourth light beams; and an angle of installation of a reflection surface of the first last reflection member is more vertical than angles of installation of reflection surfaces of the second through fourth last reflection members.

In this case, an image using the developing agent in black having the lowest brightness has the highest visibility and displacement of the image is noticeable. However, by configuring in such a manner that the angle of the reflection surface of the last reflection member provided in the optical path of a light beam corresponding to an image of this developing agent is closest to vertical, the curve of the reflection surface can be smallest, which makes the curve of the scanning line for black smaller. Displacement of the formed image therefore becomes so minor that a color shift in the color image becomes hardly noticeable.

It is preferable that an angle of installation of a reflection surface of the fourth last reflection member is more horizontal than angles of installation of reflection surfaces of the first through third last reflection members.

In this case, the reflection surface of the last reflection member provided in the optical path of a light beam corresponding to an image in yellow having the highest brightness is provided to be closest to horizontal. The curve of the scanning line of a light beam becomes largest in an optical path in which the curve of the reflection surface is largest, which makes displacement of the formed image most significant. However, by determining such a light beam as a light beam corresponding to an image in yellow having the lowest visibility, a color shift in the color image becomes hardly noticeable. It is thus possible to further reduce a color shift in the color image caused by reflecting a light beam having passed through the correction member by the last reflection member.

It is preferable that the first through fourth last reflection members are disposed sequentially along the sub-scanning direction.

In this case, it is possible to provide the first last reflection member for black having the angle of installation of the reflection surface that is closest to vertical in closest proximity to the deflector, and to provide the fourth last reflection member for yellow having the angle of installation of the reflection surface that is closest to horizontal spaced apart most from the deflector. Hence, the respective optical paths can be set and the respective members can be located more readily. The optical scanning device can be consequently reduced both in size and thickness.

An optical scanning device according to another aspect of the invention includes: plural light sources that emit light beams corresponding to images using developing agents each having different brightness; a deflector that deflects plural light beams emitted from the plural light sources as the plural light beams go incident on a same reflection surface thereof at different angles of incidence in a sub-scanning direction; plural correction members that correct the plural light beams deflected by the deflector; and plural last reflection members that reflect the light beams corrected by the plural correction members to be distributed to surfaces of different photoconductors, wherein, of the plural last reflection members, a last reflection member provided in an optical path of a light beam corresponding to an image using a developing agent having highest brightness is provided in such manner that an angle of installation of a reflection surface of the last reflection member is closest to horizontal.

According to the configuration described above, in the optical path of a light beam corresponding to an image using the developing agent having the highest brightness in which the reflection surface of the last reflection member disposed therein is provided to be closest to horizontal so that the curve of the reflection surface becomes largest, the curve of the scanning line of the light beam becomes largest, which makes displacement of the formed image most significant. However, by determining such a light beam as the light beam corresponding to an image using the developing agent having the lowest visibility, a color shift in the color image becomes hardly noticeable. It is thus possible to reduce a color shift in the color image caused by reflecting a light beam having passed through the correction member by the last reflection member.

An image forming apparatus according to still another aspect of the invention includes the optical scanning device described above, and plural photoconductors corresponding to the images using the developing agents each having different brightness.

According to the configuration as described above, by using the optical scanning device as described above in a color image forming apparatus, it is possible to make a color shift in the color image caused by reflecting a light beam having passed through the correction member by the last reflection member hardly noticeable.

This application is based on patent application No. 2006-014772 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical scanning device, comprising:
   plural light sources that emit light beams corresponding to images using developing agents each having different brightness;
   a deflector that deflects plural light beams emitted from the plural light sources as the plural light beams go incident on a same reflection surface thereof at different angles of incidence in a sub-scanning direction;
   plural correction members that correct curve errors occurring in scanning lines of the plural light beams deflected by the deflector; and
   plural last reflection members that reflect the light beams corrected by the plural correction members to be distributed to surfaces of different photoconductors, the last reflection members being disposed sequentially along a horizontal direction,
   wherein, of the plural last reflection members, a last reflection member provided in an optical path of a light beam corresponding to an image using a developing agent having lowest brightness is provided so that an angle of installation of a reflection surface of the last reflection member is closer to vertical than any of the other last reflection members, and
   of the plural last reflection members, a last reflection member provided in an optical path of a light beam corresponding to an image using a developing agent having highest brightness is provided so that an angle of installation of a reflection surface thereof is closer to horizontal than any of the other last reflection members.

2. The optical scanning device according to claim 1, wherein:
   each of the plural correction members corrects an error occurring in a corresponding light beam due to optical face tangle that the reflection surface of the deflector inclines with respect to a rotational axis of the deflector; and
   the plural last reflection members are provided, one in each optical path, between the correction members and photoconductors provided correspondingly to the respective light beams.

3. The optical scanning device according to claim 1, wherein the plural light sources include;
   a first light source that emits a first light beam corresponding to an image using a black developing agent;
   a second light source that emits a second light beam corresponding to an image using a cyan developing agent;

a third light source that emits a third light beam corresponding to an image using a magenta developing agent; and a fourth light source that emits a fourth light beam corresponding to an image using a yellow developing agent, wherein the plural last reflection members include:

a first last reflection member that reflect the first light beam;

a second last reflection member that reflects the second light beam;

a third last reflection member that reflects the third light beam; and a fourth last reflection member that reflects the fourth light beams, and wherein an angle of installation of a reflection surface of the first last reflection member is more vertical than angles of installation of reflection surfaces of the second through fourth last reflection members.

4. The optical scanning device according to claim 3, wherein:

an angle of installation of a reflection surface of the fourth last reflection member is more horizontal than angles of installation of reflection surfaces of the first through third last reflection members.

5. The optical scanning device according to claim 4, wherein:

the first through fourth last reflection members are disposed sequentially along the sub-scanning direction.

6. An image forming apparatus, comprising:

the optical scanning device set forth in claim 1; and plural photoconductors corresponding to the images using the developing agents each having different brightness.

7. An optical scanning device, comprising:

plural light sources that emit light beams corresponding to images using developing agents each having different brightness;

a deflector that deflects plural light beams emitted from the plural light sources as the plural light beams go incident on a same reflection surface thereof at different angles of incidence in a sub-scanning direction;

plural correction members that correct curve errors occurring in scanning lines of the plural light beams deflected by the deflector; and plural last reflection members that reflect the light beams corrected by the plural correction members to be distributed to surfaces of different photoconductors, the last reflection members being disposed sequentially along a horizontal direction, wherein, of the plural last reflection members, a last reflection member provided in an optical path of a light beam corresponding to an image using a developing agent having highest brightness is provided in such manner that an angle of installation of a reflection surface of the last reflection member is closer to horizontal than any of the other last reflection members.

8. An image forming apparatus, comprising:

the optical scanning device set forth in claim 7; and plural photoconductors corresponding to the images using the developing agents each having different brightness.

9. An optical scanning device, comprising:

at least first, second, third and fourth light sources that emit light beams corresponding respectively to images using a black developing agent, a cyan developing agent, a magenta developing agent and a yellow developing agent, each of the developing agents having different brightnesses;

a deflector that deflects light beams emitted from the respective light sources as the light beams go incident on a same reflection surface of the deflector at different angles of incidents in a sub-scanning direction;

first, second, third and fourth correction members disposed to correct curve errors occurring respectively in scanning lines of the first, second, third and fourth beams deflected by the deflector; and first, second, third and fourth last reflection members that reflect the light beams directed respectively by the first, second, third and fourth correction members to be distributed to surfaces of different photoconductors, the first, second, third and fourth last reflection members being disposed sequentially along a horizontal direction, wherein, the first last reflection member has a reflection surface aligned closer to vertical than reflection surfaces of any of the second, third and fourth last reflection members, and the fourth last reflection member has a reflection surface aligned closer horizontal than the reflection surfaces of any of the first, second and third last reflection members.

10. The optical scanning device according to claim 9, wherein:

the first through fourth last reflection members are disposed sequentially along the sub-scanning direction.

* * * * *